(12) United States Patent
Seo et al.

(10) Patent No.: US 9,785,337 B2
(45) Date of Patent: Oct. 10, 2017

(54) APPARATUS AND METHOD FOR PROVIDING SEARCH SERVICE

(75) Inventors: Hyun Joo Seo, Seongnam-si (KR); Maria Park, Seongnam-si (KR); Yeo Rae Kim, Seongnam-si (KR); Jeong Hoon Lim, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 381 days.

(21) Appl. No.: 13/605,418

(22) Filed: Sep. 6, 2012

(65) Prior Publication Data

US 2013/0061166 A1    Mar. 7, 2013

(30) Foreign Application Priority Data

Sep. 7, 2011    (KR) .................. 10-2011-0090537

(51) Int. Cl.
  *G06F 3/0488*    (2013.01)
  *G06F 3/0484*    (2013.01)

(52) U.S. Cl.
  CPC .......... *G06F 3/0488* (2013.01); *G06F 3/0484* (2013.01)

(58) Field of Classification Search
  CPC ... G06Q 30/0256; G06F 3/0488; G06F 3/017; G06F 17/30554; G06F 17/30864; G06F 17/30696; G06F 3/04883; G06F 3/0486; G06F 17/21; G10L 15/26; G10L 15/08
  USPC .................................................. 715/780, 863
  See application file for complete search history.

(56) References Cited

U.S. PATENT DOCUMENTS

| | | | | |
|---|---|---|---|---|
| 5,943,053 A | * | 8/1999 | Ludolph ............... | G06F 3/0481 715/790 |
| 2003/0146897 A1 | * | 8/2003 | Hunter ................... | G09G 3/342 345/102 |
| 2005/0022130 A1 | * | 1/2005 | Fabritius ................. | G06F 3/038 715/739 |
| 2005/0240538 A1 | * | 10/2005 | Ranganathan ................. | 705/400 |
| 2007/0043721 A1 | * | 2/2007 | Ghemawat et al. ............. | 707/7 |
| 2007/0163425 A1 | * | 7/2007 | Tsui ..................... | G09B 15/023 84/609 |
| 2008/0270932 A1 | * | 10/2008 | Diaz ................... | G06F 3/04812 715/780 |

(Continued)

FOREIGN PATENT DOCUMENTS

JP        2010067032 A        3/2010

OTHER PUBLICATIONS

Office Action for corresponding Korean Application No. 10-2011-0090537 dated Jul. 31, 2015.

*Primary Examiner* — Sherrod Keaton
(74) *Attorney, Agent, or Firm* — Harness, Dickey & Pierce P.L.C.

(57) ABSTRACT

A terminal device for executing an application providing a search service is provided. The terminal device may include a touch sensing display, one or more processors, and a memory. The application is configured to be stored in the memory and implemented by the one or more processors, and includes a first interface providing a code to display a first search interface corresponding to a text-based search on the touch sensing display, and a second interface providing a code to display a second search interface on the touch sensing display, when a call interaction of the second search interface corresponding to a recognition search is sensed in response to a touch input on the touch sensing display while displaying the first search interface.

16 Claims, 24 Drawing Sheets

(56) References Cited

U.S. PATENT DOCUMENTS

| | | | | |
|---|---|---|---|---|
| 2008/0307343 A1* | 12/2008 | Robert | ................ | G06F 3/04817 |
| | | | | 715/765 |
| 2010/0088634 A1* | 4/2010 | Tsuruta et al. | ................ | 715/800 |
| 2011/0295827 A1* | 12/2011 | Genser | .............. | G06F 17/30696 |
| | | | | 707/706 |
| 2012/0317503 A1* | 12/2012 | Noh | .................... | G06F 3/04883 |
| | | | | 715/760 |

\* cited by examiner

500

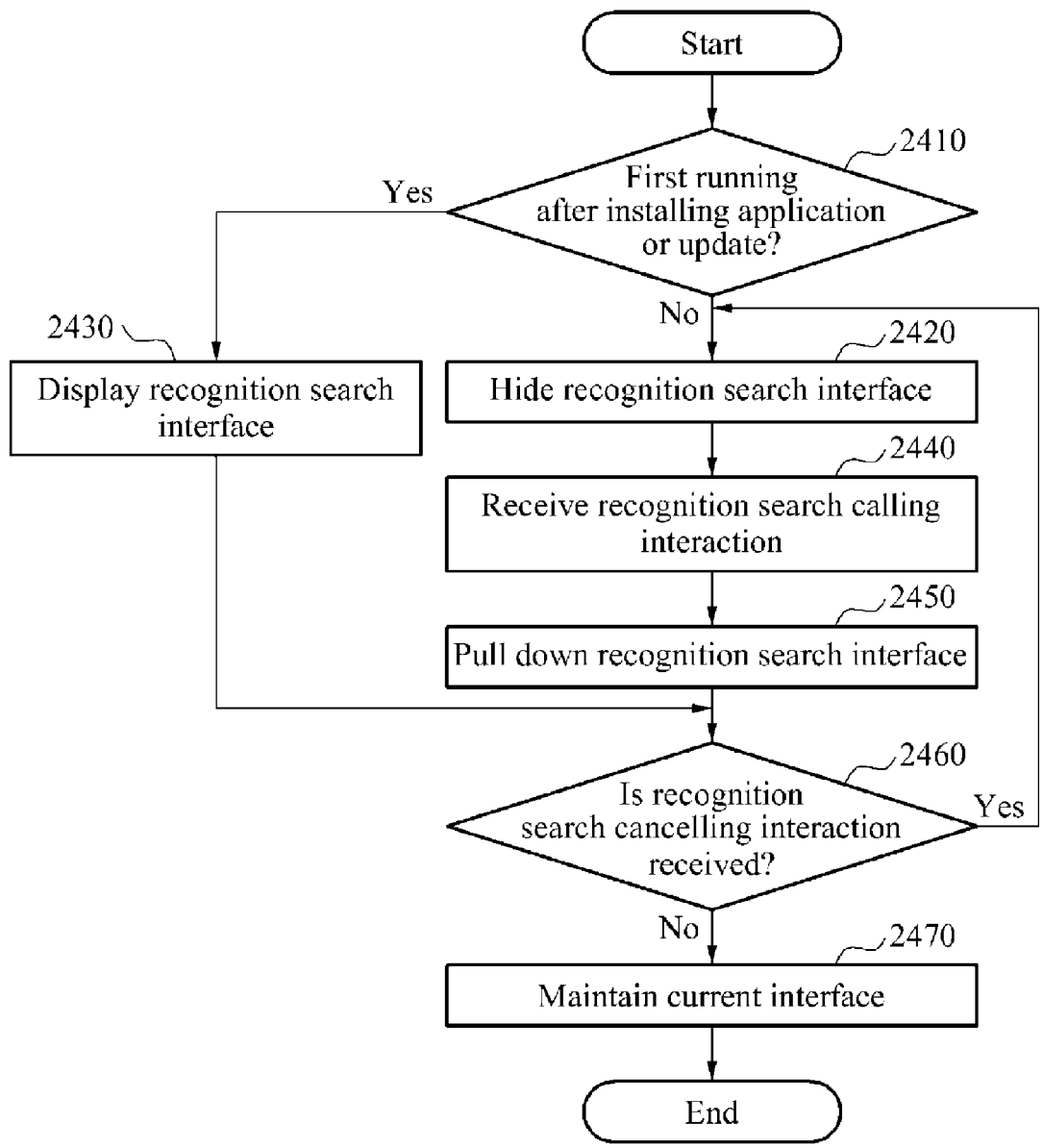

APPARATUS AND METHOD FOR PROVIDING SEARCH SERVICE

CROSS REFERENCE TO RELATED APPLICATION

This application claims priority from and the benefit of Korean Patent Application No. 10-2011-0090537, filed on Sep. 7, 2011, which is hereby incorporated by reference for all purposes as if fully set forth herein.

BACKGROUND OF THE INVENTION

Field of the Invention

Exemplary embodiments of the present invention relate to an apparatus and method for providing a search service, and to a terminal device including a search service application which provides a variety of services for a mobile terminal device and a driving method thereof.

Discussion of the Background

User eXperience (UX) covers a full perspective by integrating all the experiences a user may have while interacting with a product, a service and a provider of the product and the service. The UX may provide a visual design with intuitively operational, rapid and convenient functions.

With the wide-spread use of information technology (IT) terminal devices including touch sensing displays such as a smart phone, a tablet personal computer (PC), portable electronic devices, and smart televisions, application providers that provide a search service are becoming increasingly aware of the UX when designing functions of applications.

Recently, a more advanced search method using an image recognition, a voice recognition or a music recognition is being made available.

An image recognition-based search may include a quick response (QR) code, a barcode recognition search, an optical character recognition (OCR) search, or an image search such as a wine label recognition search, and a tool may be used for arranging a specific frame around characters to assist the OCR search.

A voice recognition-based search uses a method of applying a voice recognition algorithm to receive a voice signal to extract a text and use the text as a next keyword. A music recognition-based search employs a method of performing a feature analysis from a music input signal.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide an apparatus and method for providing a search service which allows User eXperience (UX) to be efficient and convenient.

Exemplary embodiments of the present invention also provide an apparatus and method for providing a search service which may encourage use of a recognition search service by increasing exposure of a recognition search.

Additional features of the invention will be set forth in the description which follows, and in part will be apparent from the description, or may be learned by practice of the invention.

Exemplary embodiments of the present invention disclose a terminal device to provide a search service, the terminal device including a display, and a processor to provide, a first search interface corresponding to a text-based search in a first region of the display, a second search interface corresponding to a recognition search in a second region of the display, a browsing region display content in a third region of the display.

Exemplary embodiments of the present invention also disclose terminal device to provide a search service, the terminal device including a touch sensing display, and a processor to provide a first search interface corresponding to a text-based search, a second search interface corresponding to a recognition search, and a content browsing region on the touch sensing display, wherein in response to a call interaction with the second search interface being detected, the processor is configured to provide the second search interface on the touch sensing display.

Exemplary embodiments of the present invention also disclose a terminal device to execute an application providing a search service, the terminal device including a touch sensing display, a processor, and a memory, and wherein the application is configured to be stored in the memory and to be executed by the processor, the application comprising, a first interface to display a first search interface corresponding to a text-based search corresponding to a code on the touch sensing display, and a second interface to display a second search interface on the touch sensing display, in response to a call interaction with the second search interface corresponding to a recognition search associated with the code being detected, while displaying the first search interface.

Exemplary embodiments of the present invention also disclose a method to provide a search service, the method including displaying a first search interface corresponding to a text-based search on a touch sensing display of the terminal device, receiving a touch input on the touch sensing display while the first search interface is displayed, sensing a call interaction of the second search interface by the processor, and displaying the second search interface on the touch sensing display.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 24 is a flowchart illustrating the method for executing a recognition search application according to exemplary embodiments of the present invention.

DETAILED DESCRIPTION OF THE ILLUSTRATED EMBODIMENTS

Figure 1:
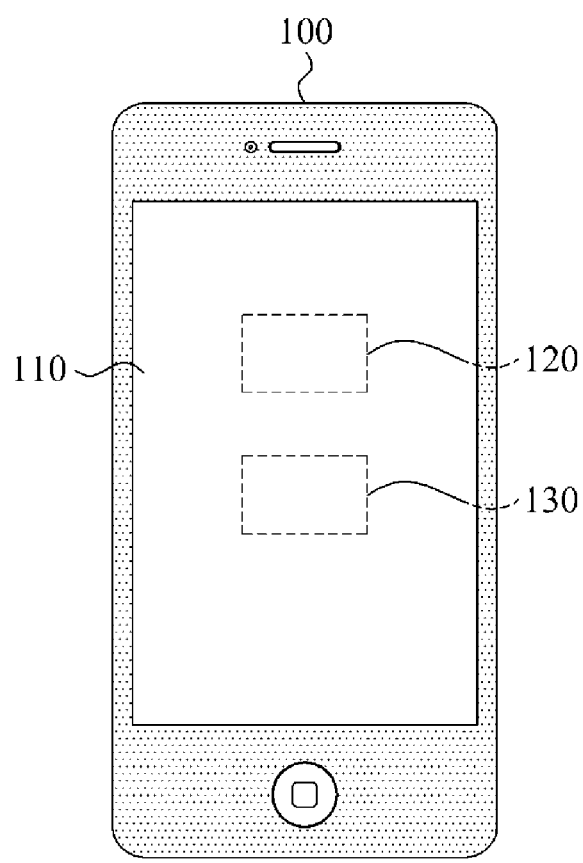
FIG. 1 illustrates a terminal device for providing a search service according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention are described in detail with reference to the accompanying drawings.

FIG. 1 illustrates a terminal device 100 for providing a search service. A terminal device 100 may be one of a wide range of information technology (IT) devices such as a smart phone, a tablet personal computer (PC), portable electronic devices, and smart televisions. The terminal device 100 may include a touch sensing display 110 as a means of providing a user interface.

A processor 120 may drive an application stored in a memory 130, and may render a search service application on the touch sensing display 110.

A process of driving, by the processor 120, the application stored in the memory 130 and providing a search service is described hereinafter with reference to FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, and FIG. 24.

Figure 2:
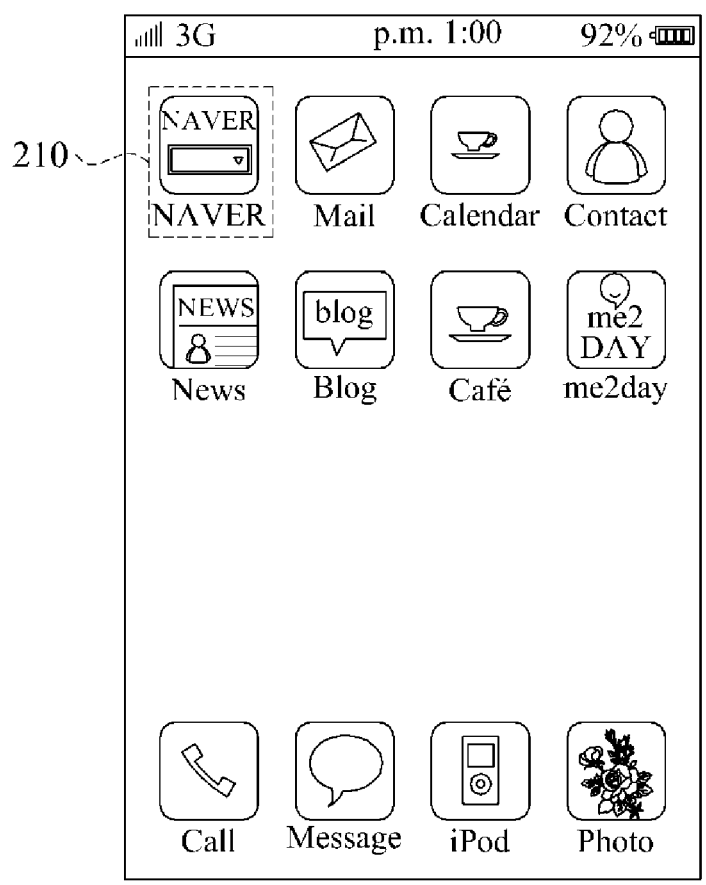
FIG. 2 illustrates a plurality of application graphical user interfaces (GUIs) displayed on a touch sensing display of the terminal device of FIG. 1 according to exemplary embodiments of the present invention.

FIG. 2 illustrates a plurality of application graphical user interfaces (GUIs) displayed on a touch sensing display 110 of the terminal device 100 of FIG. 1.

GUIs for implementing an application may include a GUI 210 for implementing a search service providing application.

When the GUI 210 is selected in response to a touch input on the touch sensing display 110, the search service providing application may start. The touch input may be a user input. For example, the touch input may be a user touching the touch sensing display 110 with the user's finger or with a stylus. It should be understood that various type of touch inputs may be used.

The application driving screen and application driving motion are described with reference to FIG. 3.

Figure 3:
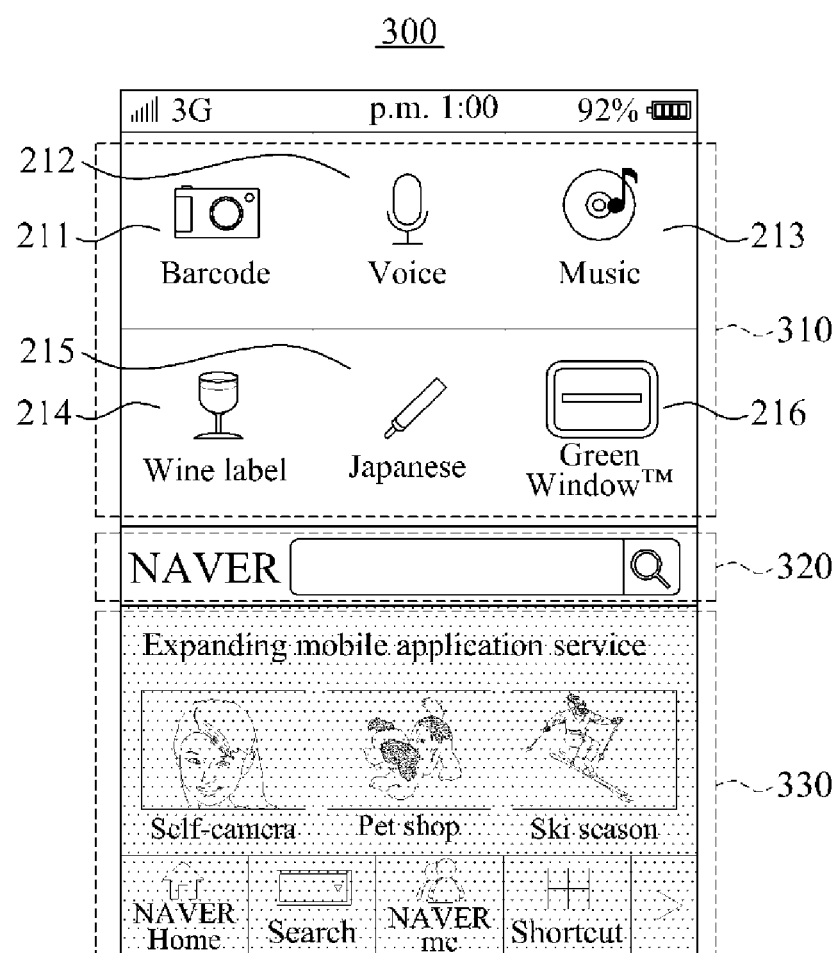
FIG. 3 illustrates a screen configuration when executing a search service providing application according to exemplary embodiments of the present invention.

FIG. 3 illustrates a screen configuration 300 of a search service providing application.

The search service providing application may provide both a recognition search and a general text-based search, and any one of the recognition search and the general text-based search may be used for receiving a query for providing a search service by a selection.

Since the user may not be aware of the fact that a recognition search service may be provided, or since a recognition search service interface is not found intuitively or directly, utilization of the recognition search service may be low. Further, a producer/distributor of the search service providing application perceives a need for improving efficiency of utilization of the recognition search service.

When an application is installed in a terminal device 100 for a first time or updated, a recognition search interface 310 may be provided, within a screen configuration 300, along with a general text-based search interface 320.

A browsing region 330 to provide a search result using contents forwarded from a service providing server (not shown) or the recognition search interface 310 and/or the text-based search interface 320 may also be provided. In some cases, the browsing region 330 may be provided in a visually distinguishable manner (e.g. dimmed), as illustrated in FIG. 3.

In the screen configuration 300, when a user touches any one of GUIs 211 to 216, a relevant recognition search may be conducted. A process of conducting the recognition search is described in detail with reference to FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23.

A barcode ('code') that encompasses notions of a one-dimensional (1D) barcode, a two-dimensional (2D) QR code, a search, a voice search, a music search, a wine label search, a Japanese search and a Green Window™ search corresponding to the GUIs 211 to 216 are provided as examples of the recognition search. However, the exemplary embodiments of the present invention are neither limited thereto nor restricted thereby. Thus, it will be apparent to those skilled in the art that various modifications and variations in the type and form of the recognition search and a specific design of the GUI can be made without departing from the spirit or scope of the invention. It should also be appreciated that various search may be performed and corresponding GUI may be displayed in the recognition search interface 310.

Figure 4:
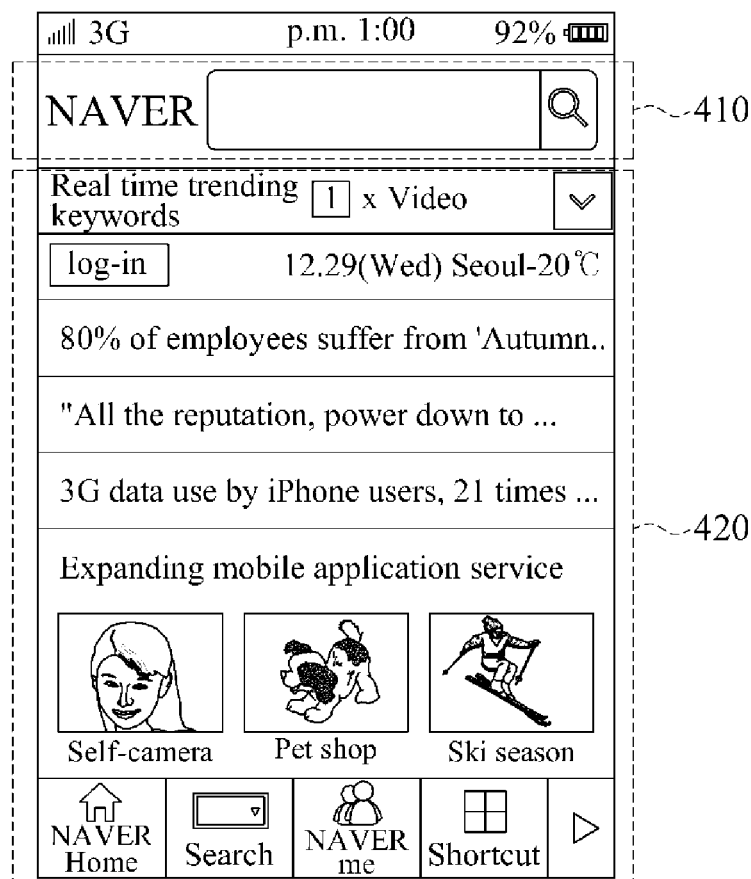
FIG. 4 illustrates an in-application (App) screen configuration to provide a general text-based search according to exemplary embodiments of the present invention.

FIG. 4 illustrates an in-App screen configuration 400 to provide a general text-based search.

in-App is a variation of App, which is an abbreviation of application, and refers to an application configuration that provides a global navigating bar (GNB), a variety of services while an application is being executed, a browsing region 420 to provide contents, and a text search interface 410.

An example of a user calling a recognition search interface during a service of such in-App screen configuration 400 is described with reference to FIG. 5.

Figure 5:
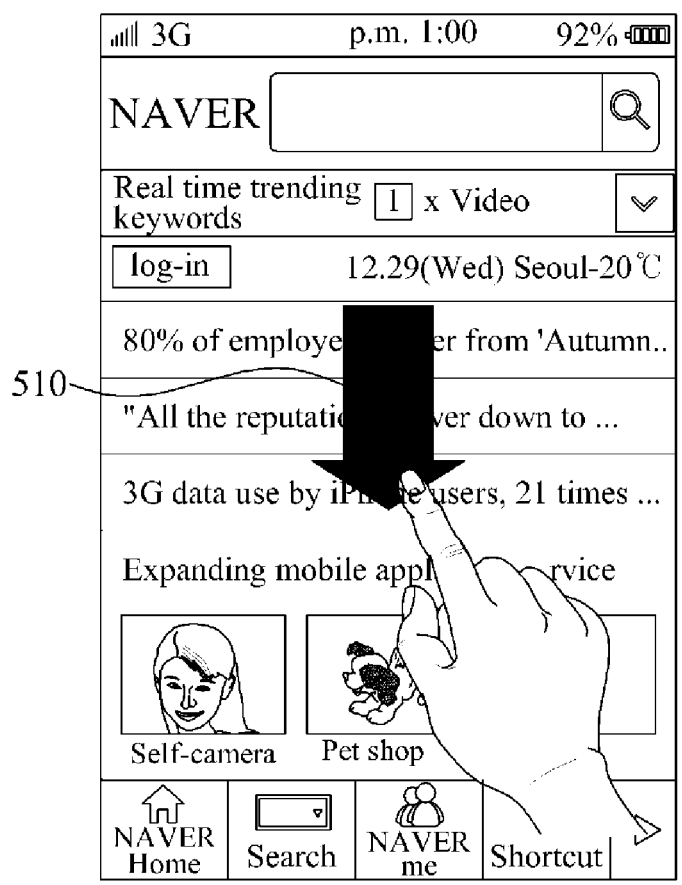
FIG. 5 illustrates a state of receiving a recognition search calling interaction in response to a touch input according to exemplary embodiments of the present invention.

FIG. 5 is a map 500 illustrating a state of receiving a recognition search calling interaction in response to a touch input of a user.

When the user touches a display the touch sensing display 110 and then feeds a gesture input 510 by performing a drag input (e.g., dragging of the user's finger on the display 110) towards a certain direction, the terminal device 100 may determine the gesture input 510 as the recognition search calling interaction to start providing a recognition search interface. The process is further described with reference to FIG. 6.

Figure 6:
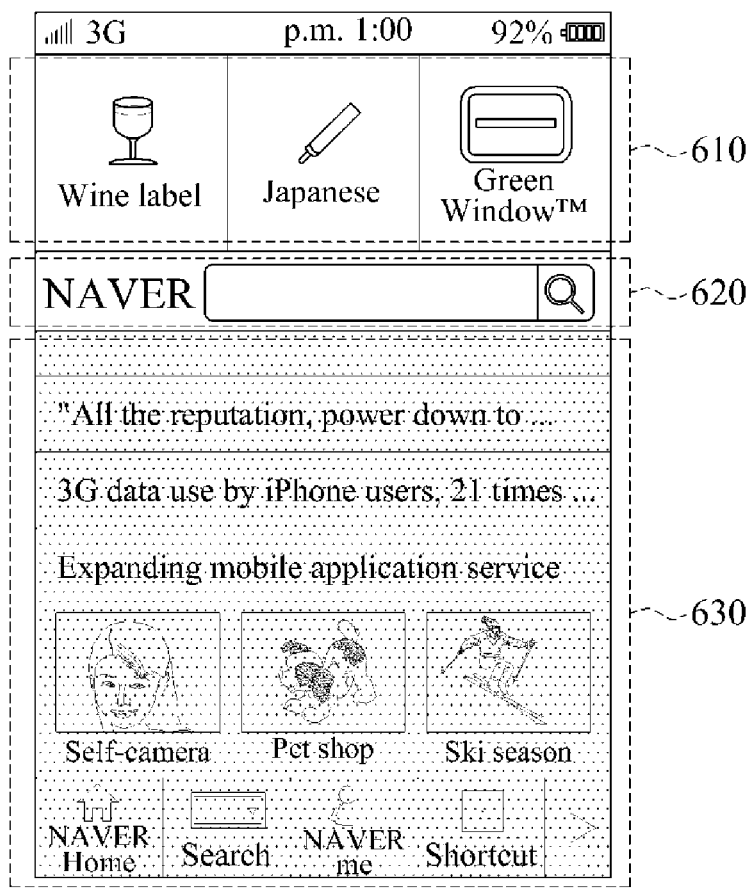
FIG. 6 illustrates a state where a recognition search interface is pulled down in response to a recognition search calling interaction according to exemplary embodiments of the present invention.

FIG. 6 illustrates a state in which a recognition search interface is pulled down in response to a recognition search calling interaction.

A screen configuration 600 illustrates a process where the processor 120 of a terminal device 100 renders a transition animation on the touch sensing display 110 in response to the recognition search calling interaction.

A recognition search interface 610 is hidden in FIG. 5. However, in response to a reception of the recognition search calling interaction, the recognition search interface 610 may be pulled down following a drag input of a user.

The term "pull-down" may refer to a visualization process where a hidden region comes into view in response to a drag interaction, and the term "drop-down" may refer to a visualization process where a hidden region comes into view by clicking on a downward arrow or a specific button.

Although exemplary embodiments of the present invention are described hereinafter using only the pull-down action as an example, the pull-down may be replaced with the drop-down action without departing from the spirit or scope of the exemplary embodiments of the present invention.

A general text-based search interface 620 may move downward by a recognition search interface 610 being displayed, and a browsing region 630 may shrink gradually as it gets darker due to dimming effects. After completion of the transition animation associated with the recognition search interface 610, the screen configuration 300 of FIG. 3 may be displayed.

However, when a drag input is suspended at a point where a value of an exposed portion of the recognition search interface 610 is lower than a predetermined threshold value, for example, one fourth of the total portion, and the recognition search interface 610 is released, a transition animation rolls back and returns to a state as shown in FIG. 5.

Similarly, when the recognition search interface 610 is released at a point when such transition animation progresses beyond the threshold value, the transition animation may progress all the way down, and as a result the screen configuration 300 of FIG. 3 is achieved.

Figure 7:
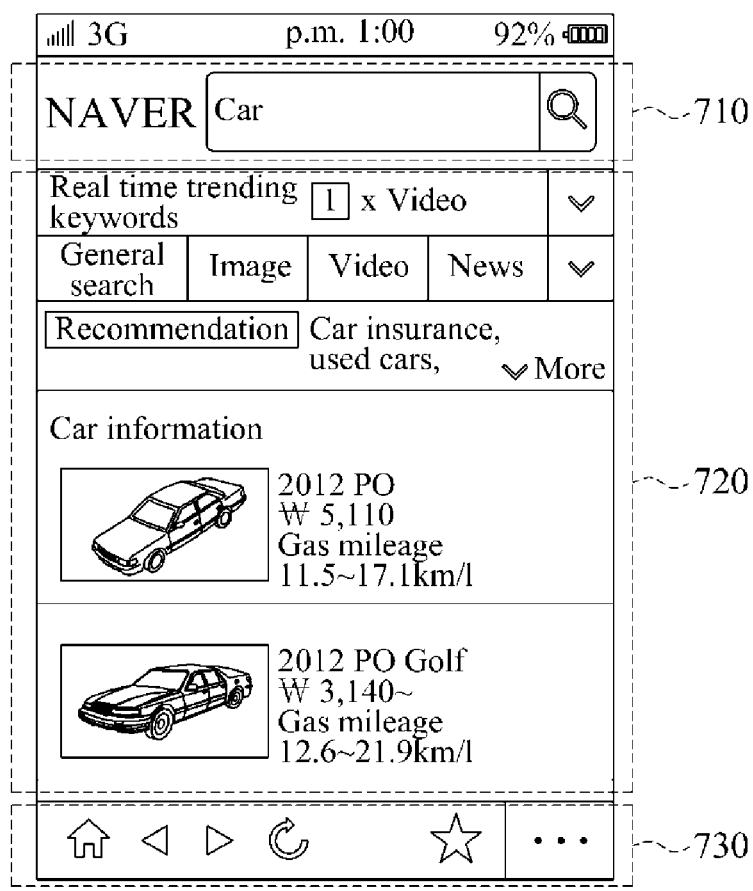
FIG. 7 illustrates a state of providing, in an in-Web screen configuration, a search result of a query according to exemplary embodiments of the present invention.

FIG. 7 illustrates a state of providing a search result of a user query in an in-Web screen configuration 700.

Referring to FIG. 7, the in-Web screen configuration 700, differing from the in-App screen configuration 400 of FIG. 4, is illustrated. The in-Web screen configuration 700 may refer to a browser within an application that provides global browsing while the application is executed.

In the in-Web screen configuration 700 of FIG. 7, an interface 710 such as a search window for a general text-based search may be provided along with a browsing region 720 and a control bar 730.

Figure 8:
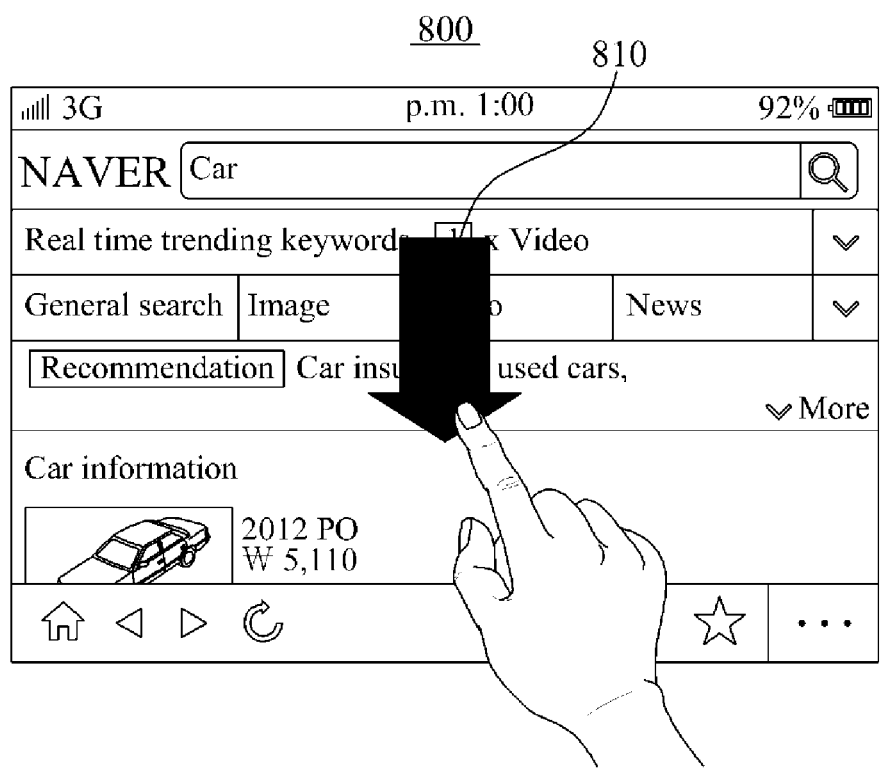
FIG. 8 illustrates a state of the in-Web screen configuration of FIG. 7 being switched to the landscape view mode according to exemplary embodiments of the present invention.

During execution of the in-Web screen configuration 700, it may be possible to support a landscape view mode by detecting a direction of gravity relative to the terminal device 100, as illustrated in FIG. 8. It should be understood that an orientation (e.g., landscape or portrait view) of the terminal device 100 may be determined using various suitable means, such as, for example, pressure and geomagnetic sensors.

FIG. 8 illustrates the in-Web screen configuration 700 of FIG. 7 being switched to the landscape view mode.

A screen configuration 800 illustrates the in-Web screen configuration 700 of FIG. 7 being enlarged to the landscape view mode.

However, in the in-Web landscape view mode, a recognition search calling interaction 810 may still be received and processed. For example, the recognition search calling interaction may be a touch and drag input on a touch sensing display as illustrated in FIG. 5. A processing result in the above case is shown in FIG. 9.

Figure 9:
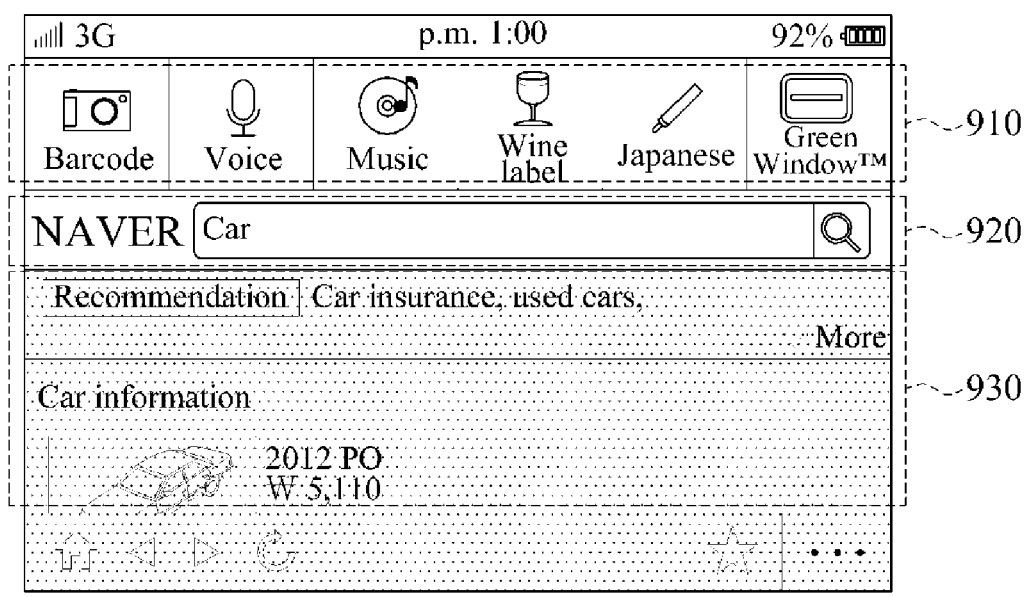
FIG. 9 illustrates a processing result when a recognition search calling interaction is received in response to a touch input in FIG. 8 according to exemplary embodiments of the present invention.

FIG. 9 illustrates the processing result when the recognition search calling interaction 810 is received in response to a touch input of a user in FIG. 8.

A recognition search interface 910 may be provided in an in-Web screen configuration 800 in a landscape view mode, a general text-based search interface 920 may be provided while being pulled down, and a browsing region 930 may be in a dimmed state.

The in-Web screen configuration 700 may be similar to the screen configuration 300 of FIG. 3 displaying a recognition search interface in the in-App screen configuration 400 of FIG. 4. However, unlike the in-App screen configuration 400, the in-Web screen configuration 800 may support a landscape view mode and, the screen configuration 900 may be provided in the landscape view mode.

In some cases, the landscape view mode may also be supported in an in-App screen configuration depending on a set-up.

A recognition search service corresponding to each GUI within the recognition search interface 910 or the recognition search interface 310 of FIG. 3 is described hereinafter with reference to FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22 and FIG. 23.

Figure 10:
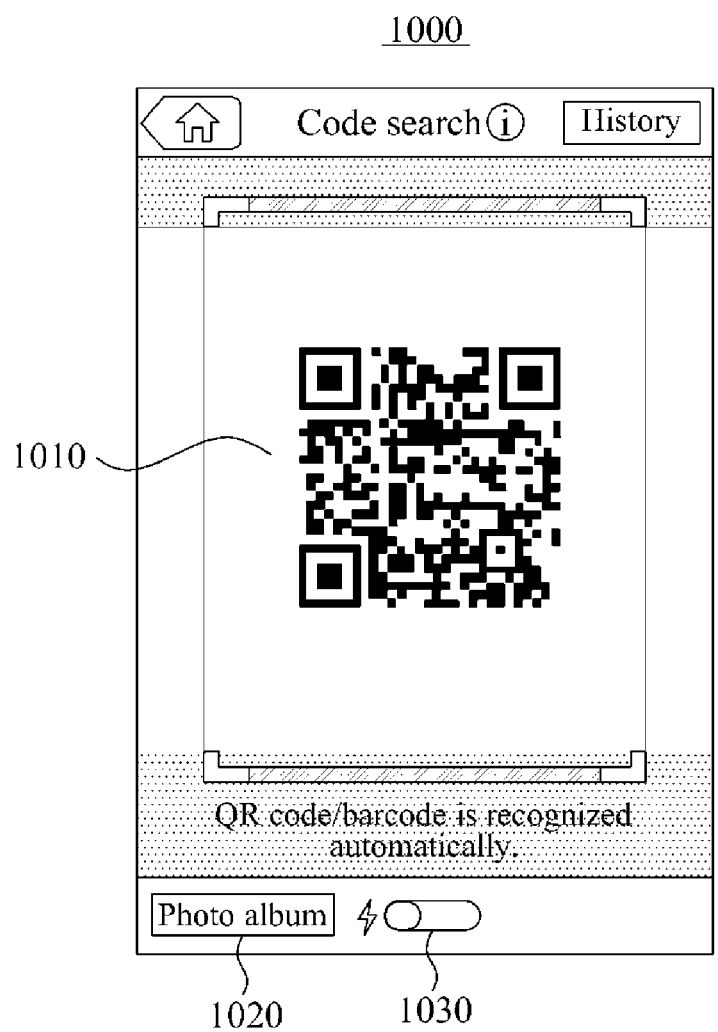
FIG. 10 and FIG. 11 illustrate a process of conducting a code search in the recognition search according to exemplary embodiments of the present invention.
Figure 11:

FIG. 10 and FIG. 11 illustrate a process of conducting a code search in the recognition search The process of conducting the code search may begin by a user selecting (e.g., a touch input) on the GUI 211 of FIG. 3.

Subsequently, when the user employs a built-in camera of a terminal device 100 to photograph a code and place the code within a recognition region 1010, and an application may extract the code as text information by identifying and decoding the code.

In some cases, an instant photo may be taken using an image-acquisition device (e.g., camera) built into the terminal device 100. When the terminal 100 is in a dark environment, a built-in flash in the terminal device 100 may be turned on by a flash motion button 1030. In some cases, a photo album loading button 1020 may be used to load a previously-photographed or stored image of a code instead of taking an instant photo.

A result of conducting the code search is illustrated in FIG. 11. When the code is identified and decoded, information corresponding to the code may be provided. For example, a "PO Car" may correspond to the identified code. The user may then use the text provided by decoding the code and use the text as a search term to conduct a search. FIG. 11 shows exemplary search results for a "PO Car".

Figure 12:
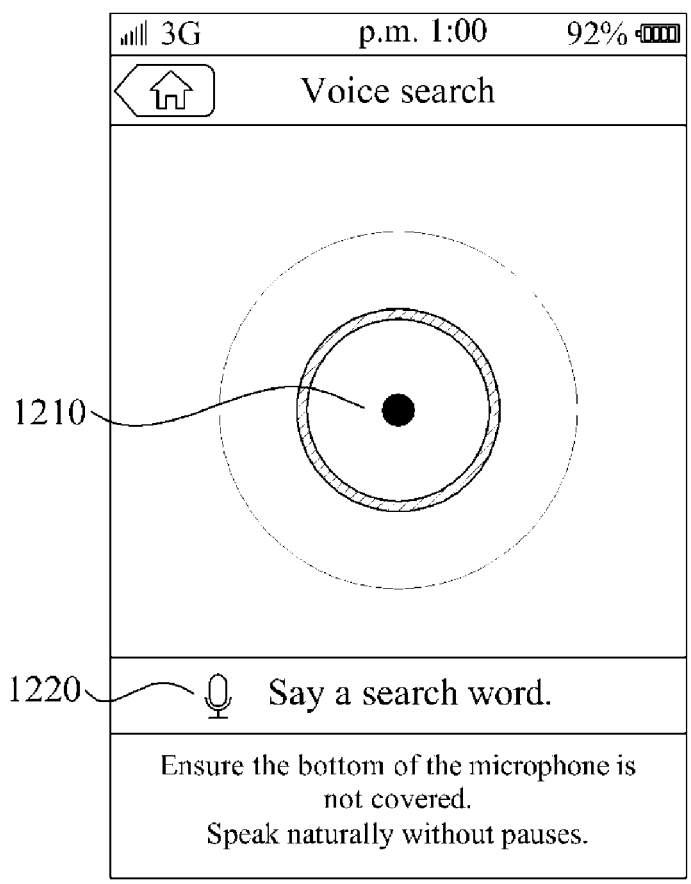
FIG. 12 and FIG. 13 illustrate a process of conducting a voice search in the recognition search according to exemplary embodiments of the present invention.
Figure 13:
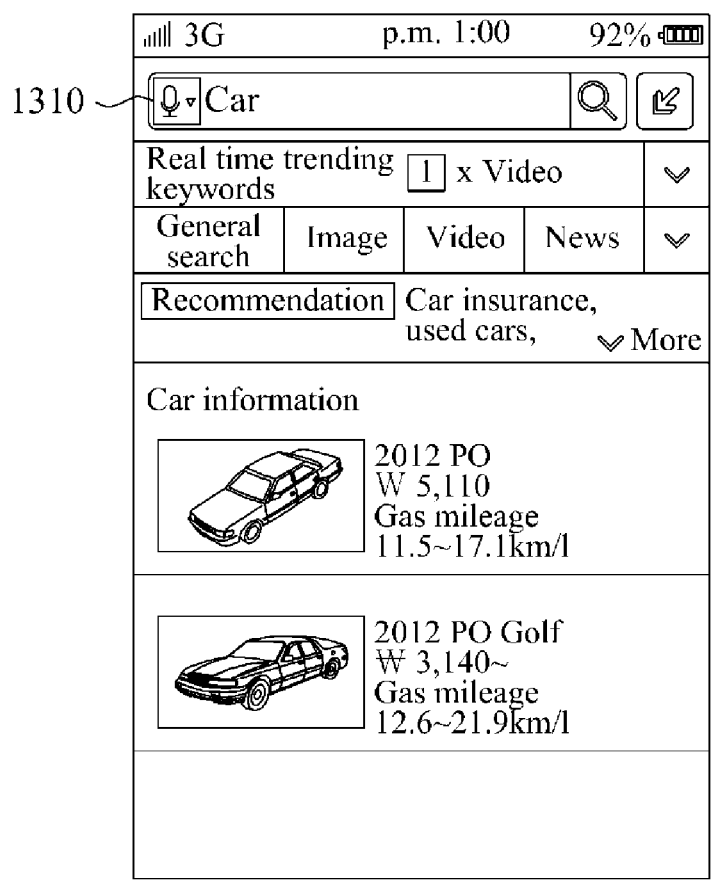

FIG. 12 and FIG. 13 illustrate a process of conducting a voice search in the recognition search.

The process of conducting the voice search may begin by a user (e.g., a touch input) on the GUI 212 of FIG. 3.

Subsequently, in screen configuration 1200, the voice search may be conducted by input of a voice via a built-in microphone in a terminal device 100 after a user touches a voice input start button 1210. A guideline for the voice search may be provided in an instructional region 1220.

After the voice has been input, a voice recognition algorithm may be run in the terminal device 100 or in a network connected server to deduce a text information. The deduced text information may be used as a search query to perform a search. The search may be performed by any suitable server, such as a network (e.g., internet) server. Examples of the voice recognition algorithm include, but are not limited to, voice-to-text conversion algorithms. Since voice recognition algorithms are generally known in the art, a detailed description of the music recognition algorithm is not provided herein. A search result for the deduced text information is shown in FIG. 13.

FIG. 13 illustrates a state where a voice search GUI 1310 is provided along with a general text-based search interface. At least a portion of recognition search GUIs may be provided and combined with a text search interface. As an example, when a user touches the voice input start button 1210, as shown in FIG. 12, and says "Car", the voice recognition algorithm may determine that the user has input the word "Car", and may perform a search for "Car". Search results for "Car" can be displayed in the terminal, as shown in FIG. 13.

Figure 14:
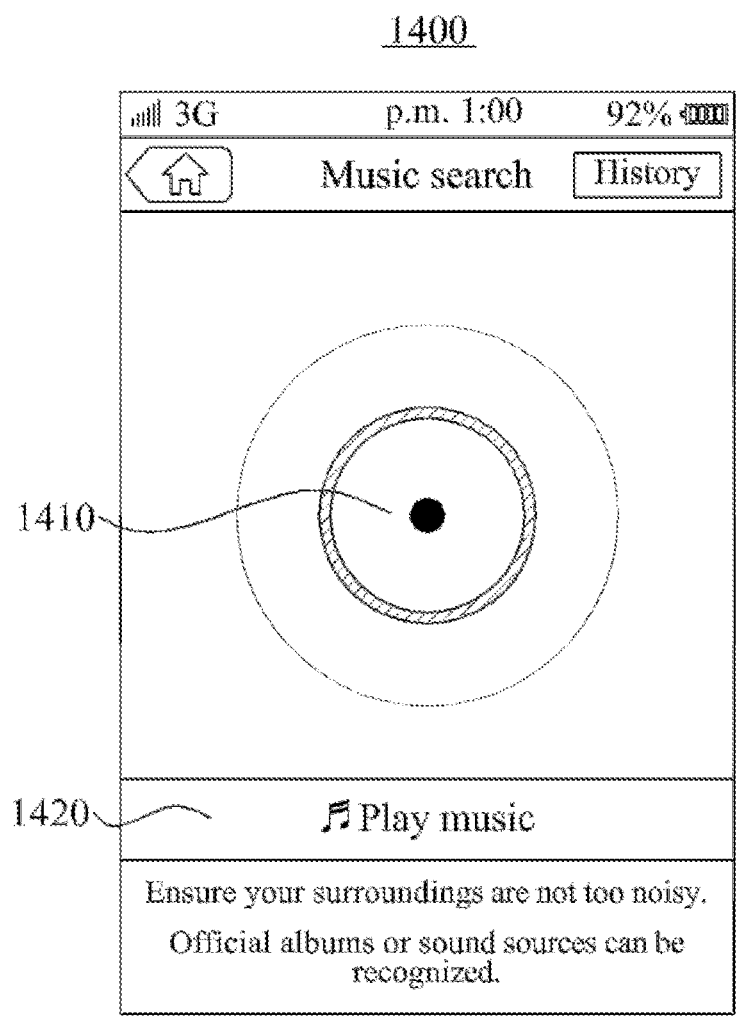
FIG. 14 and FIG. 15 illustrate a process of conducting a music search in the recognition search according to exemplary embodiments of the present invention.
Figure 15:
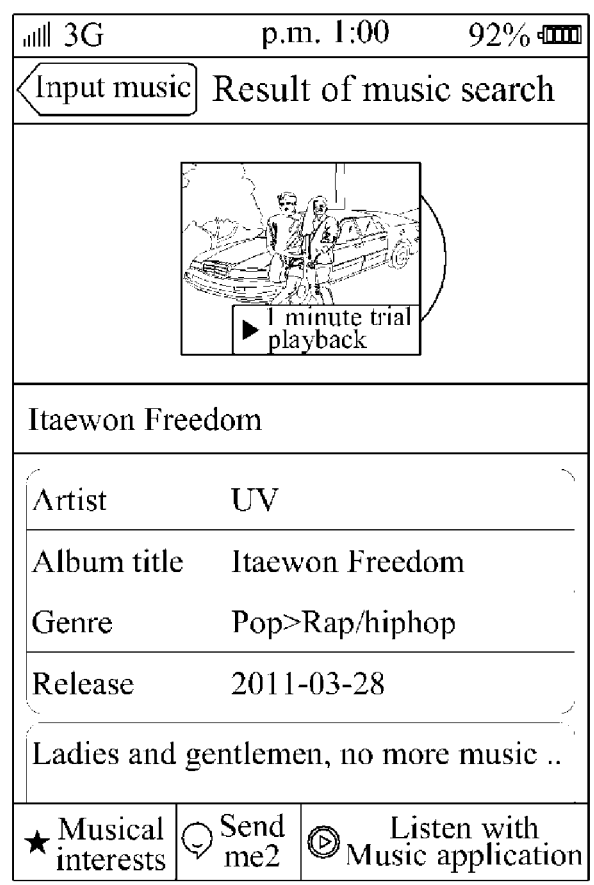

FIG. 14 and FIG. 15 illustrate a process of conducting a music search in the recognition search.

The process of conducting the music search may begin by a user selecting (e.g., a touch input of) the GUI 213 of FIG. 3.

Although the music search is analogous to the voice search described in FIG. 12 to FIG. 13, a difference lies in utilizing a music recognition algorithm which may differ from a voice recognition algorithm. Various suitable types of music recognition algorithms may be used. Since music recognition algorithms are generally known in the art, a detailed description of the music recognition algorithm is not provided herein.

After the touch input on GUI 213, a configuration screen 1400 may be provided, and a music input start button 1410 and an instructional region 1420 may be displayed. The user may select the music input start button 1410 to input a sound wave (e.g., music). Subsequently, a music recognition algorithm may be run in the terminal device 100 or in a network connected server to deduce information related to the input music. The deduced music information may be used as a search query to perform a search. The search may be performed by any suitable server, such as a network (e.g., internet) server.

A search result for the deduced information associated with the input music is illustrated in FIG. 15. The search result may include artist, album, genre, release date, a sound clip, and other information related to the deduced music information. Various application services to provide music retrieved through the music search, social network services (SNS), menus for connecting to external applications, or additional information such as lyrics or albums may additionally be provided.

Figure 16:
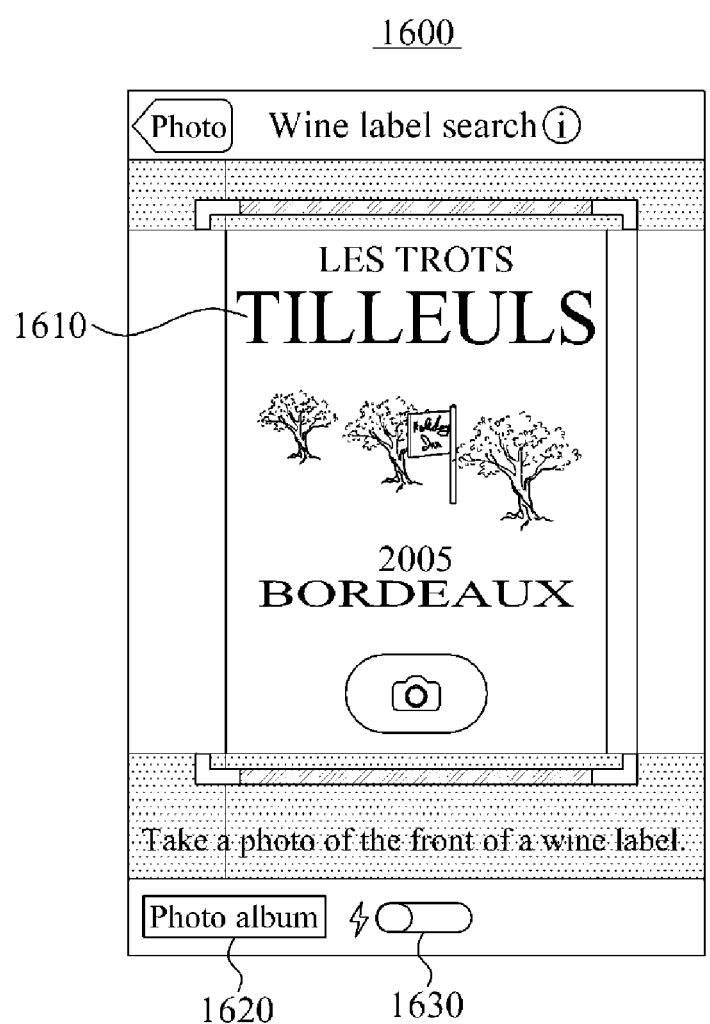
FIG. 16 and FIG. 17 illustrate a process of conducting a wine label recognition search in the recognition search according to exemplary embodiments of the present invention.
Figure 17:
Figure 18:
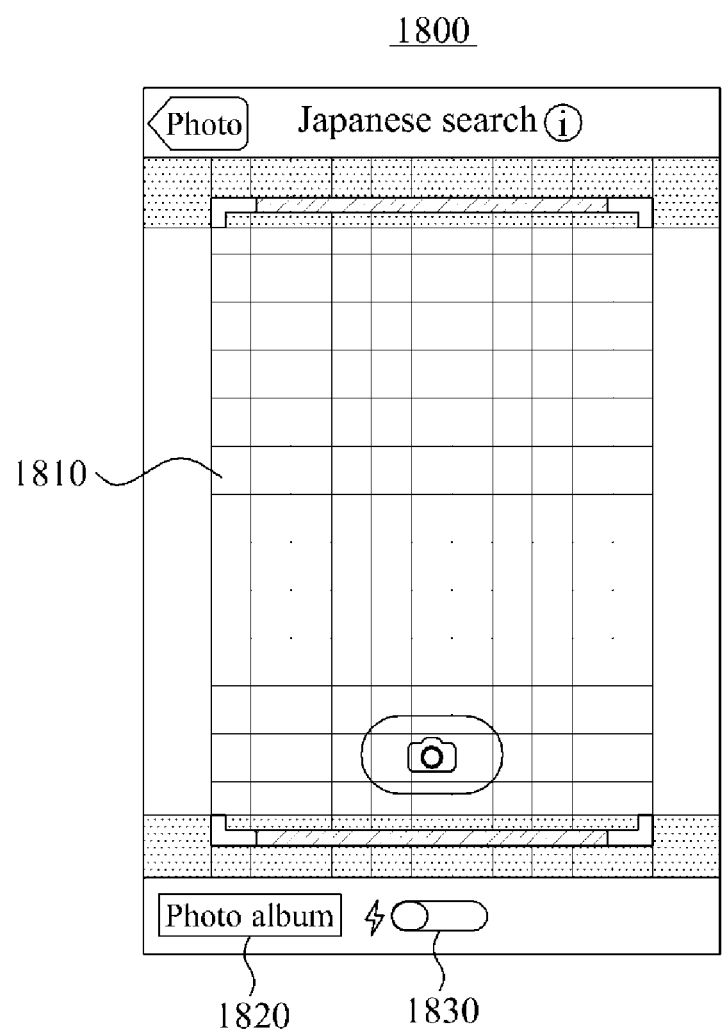
FIG. 18, FIG. 19, FIG. 20, and FIG. 21 illustrate a process of conducting a Japanese recognition search in the recognition search according to exemplary embodiments of the present invention.

FIG. 16 and FIG. 17 illustrate a process of conducting a wine label recognition search in the recognition search.

The process of conducting the wine-label recognition search may begin by a user selecting (e.g., a touch input on) the GUI 214 of FIG. 3.

After the touch input on GUI 214, a screen configuration 1600 may be provided, a wine label may be photographed using an image-acquisition device (e.g., camera) built into the terminal device 100, and an image of the wine label may be displayed in a recognition region 1610. In some cases, a previously-photographed image or stored image of a wine label may be used by selecting a photo album loading button 1620 instead of taking an instant photo. The image of the wine label is then used to perform a search for obtaining information about the wine label. The wine label search may be similar to a general image search, however, the wine label search is distinguished from the general image search in that an image search target DB is limited to wine-relevant data. The method for performing image searches is known in the art, therefore a detailed description of performing a wine label image search is omitted herein.

Descriptions related to a photo album loading button 1620 and a flash motion button 1630 may be similar to the photo album loading button 1020 and flash motion button 1030 described above with reference to FIG. 10, and further detailed description will be omitted.

In FIG. 17, a result of conducting the wine label search is illustrated. The result may provide purchasing information such as a wine price, the name and type of wine, sugar content of wine, the occasion in which the wine is drunk, the country of production of wine, and various other information about the wine. Although not shown, a connection to a shopping short-cut may also be provided to facilitate a user in purchasing the wine.

FIG. 18, FIG. 19, FIG. 20 and FIG. 21 illustrate a process of conducting a Japanese recognition search in the recognition search.

The process of conducting the Japanese recognition search may correspond to a touch input of the GUI 215 of FIG. 3.

Referring to a screen configuration 1800, a distinctive feature in the Japanese recognition search is that Japanese characters may be recognized in a recognition region 1810, and general OCR engines may be utilized. Descriptions related to a photo album loading button 1820 or a flash motion button 1830 are similar to the aforementioned code search and will be omitted.

Figure 19:
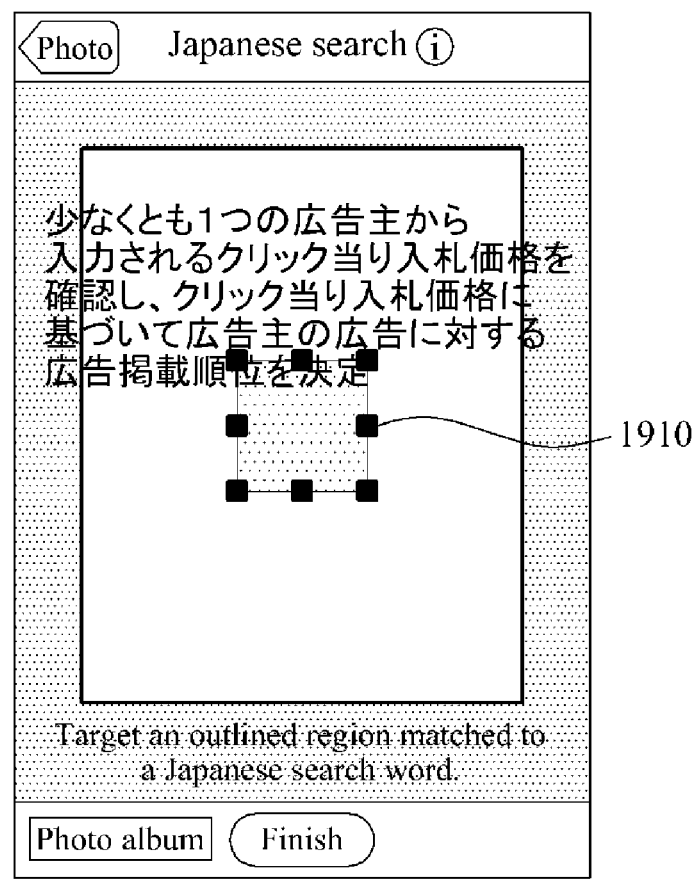

The Japanese recognition search may be characterized by a process in which a user targets a region for applying an OCR algorithm precisely, by adjusting a location or a size of a box 1910 of FIG. 19.

Figure 20:

When a user completes targeting (2010) of FIG. 20, and/or touches a completion button (2020), the OCR algorithm may be run to recognize a text (2010).

Figure 21:
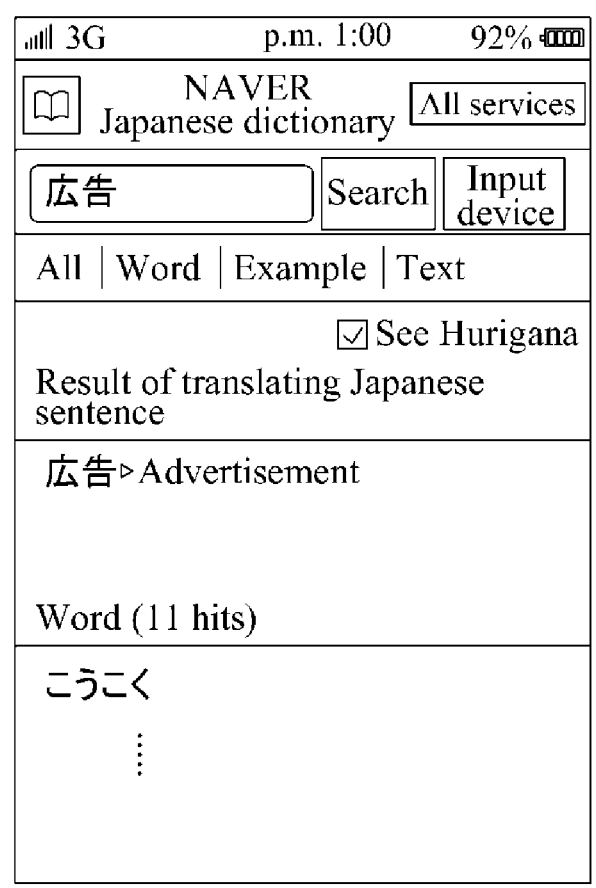

A result of conducting the above text recognition is provided as a query in a Japanese dictionary as shown in FIG. 21.

Figure 22:
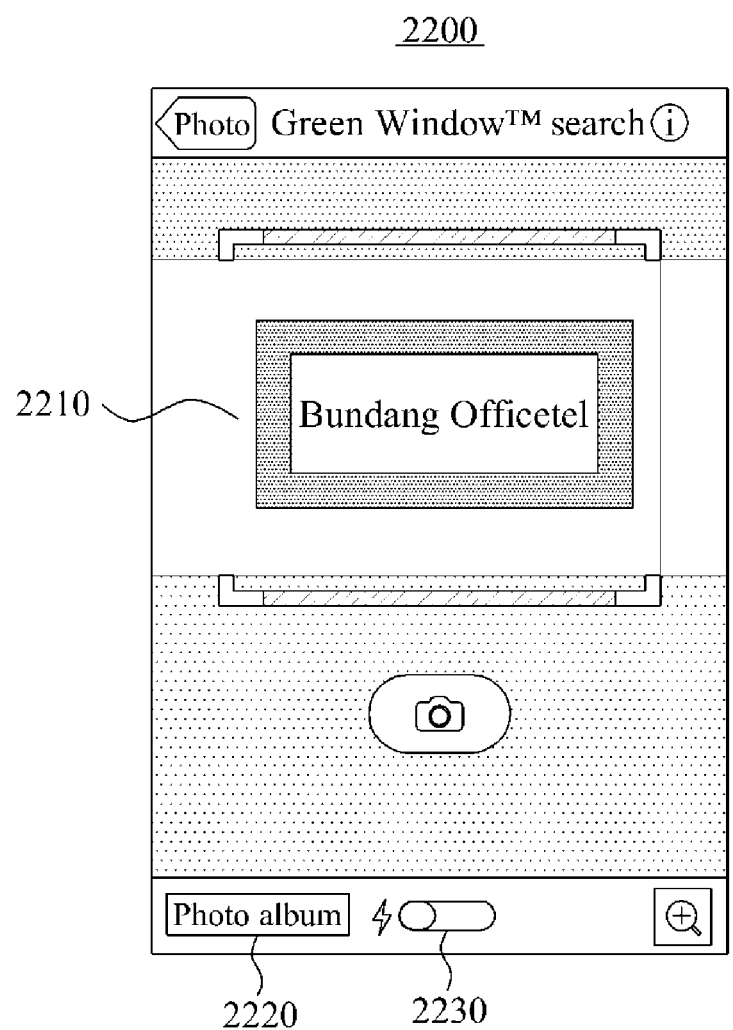
FIG. 22 and FIG. 23 illustrate a process of conducting a Green Window™ search in the recognition search according to exemplary embodiments of the present invention.
Figure 23:
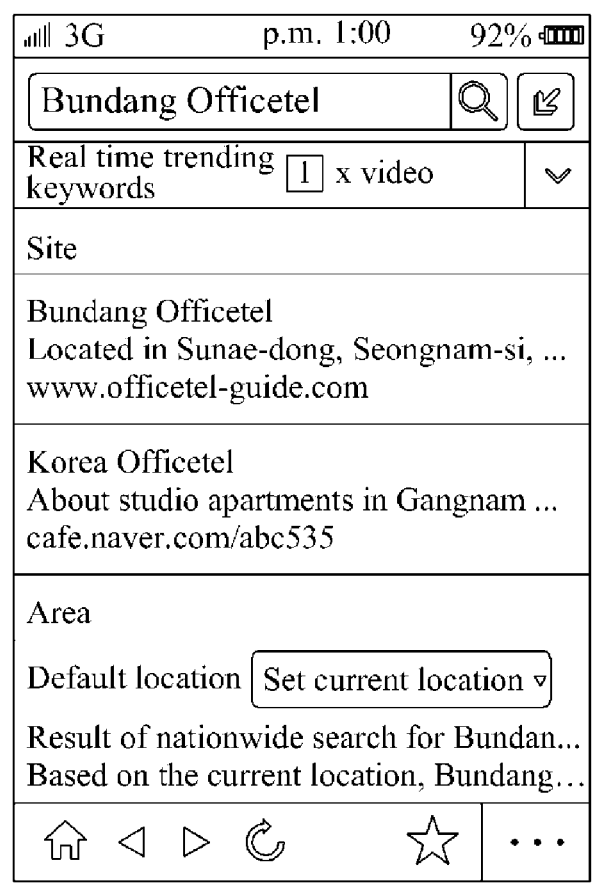

FIG. 22 and FIG. 23 illustrate a process of conducting a Green Window™ search in the recognition search.

The process of conducting the Green Window™ search may correspond to a touch recognition search of the GUI 216 of FIG. 3.

As shown in a screen configuration 2200, a distinctive aspect of the Green Window™ search is that a predetermined frame within a recognition region 2210 may become a target to be photographed and recognized.

Subsequently, instead of designating a text recognition region as in the box 1910 of FIG. 19, the text recognition region may be designed to be confined within the predetermined frame. Generally, the Green Window™ search may be utilized in a manner such that advertisers provide keywords of respective frames through varying media. In some cases, the keywords may have been purchased by the advertisers.

A photo album loading button 1820 is provided such that photos taken when a user is not connected to a network may be loaded, and a flash motion button 2230 may also be provided.

A result of conducting such Green Window™ search is illustrated in FIG. 23.

FIG. 24 is a flowchart illustrating the method for executing a recognition search application.

After a start-up of an App, a processor in the terminal 100 may determine whether the App t is being executed for the first time or if the App has been updated (2410).

If the App is being executed for the first time or has just been updated, one or more of a recognition search interface 310, a general search interface, a text-based search interface 320, and a browsing region 300 may be displayed on terminal 100 as shown in the screen configuration 300 of FIG. 3.

Descriptions provided with reference to FIG. 3 about dimming and other aspects in the browsing region are as above and further detailed description will be omitted.

When the App is not being executed for the first time or has not been updated, the recognition search interface 310 may be hidden (2420). Accordingly, the terminal 100 may display a screen such as the in-App screen configuration 400 of FIG. 4 or the in-Web screen configuration 700 of FIG. 7.

When a recognition search calling interaction is received (2440), an App may pull down a recognition search interface (2450).

A transition animation (e.g., pulling down or rolling back) of the recognition search interface 310 is described with reference to FIG. 5 and FIG. 6, and further detailed description will be omitted.

If a recognition search cancelling interaction is received (2460) during display of the recognition search interface 310, the recognition search interface 310 may be hidden again (2420). Accordingly, a general in-App screen configuration 400 or in-Web screen configuration 700 may be provided.

The recognition search cancelling interaction may respond to an instruction for resetting the recognition search interface 310 to a hidden mode.

The recognition search cancelling interaction may be understood in a context in which a user touches a browsing region 330 that is dimmed or another random region apart from the recognition search interface 310.

When a recognition search interface is pulled down or dropped down by a touch and drag input on a touch sensing display 110 of a terminal device 100, a touch and drag input from the opposite direction may be received during display of the recognition search interface. The input may be accepted as a recognition search cancelling interaction.

If the recognition search cancelling interaction is not received (2460), display of the recognition search interface 310 may be maintained (2470).

The recognition search cancelling interaction may refer to, for example, a touch input at a browsing region 330 of FIG. 3. However, the exemplary embodiments of the present invention are not limited thereto and the recognition search interface 310 may be cancelled using various methods.

The exemplary embodiments of the present invention may be recorded in computer-readable media including program instructions to implement various operations embodied by a computer. The computer may include a processor, and various other hardware and software components for implementing the exemplary embodiments of the invention. The media may also include, alone or in combination with the program instructions, data files and data structures. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), and flash memory. Examples of program instructions include both machine code, such as produced by a compiler, and files containing higher level code that may be implemented by the computer using an interpreter. The described hardware devices may be configured to act as one or more software modules in order to perform the operations of the above-described exemplary embodiments of the present invention. Data from the App and/or the application may be stored in a computer-readable medium, as described above, or a storage unit or any suitable memory device in the computer.

Accordingly, as described hereinabove, a search service may provide a user with User eXperience (UX) with maximum efficiency and convenience.

Further, a recognition search service may increase exposure of a recognition search, and may enable intuitive and rapid switching between the recognition search service and a general text-based search service.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method using at least one processor to provide a search service, the method comprising:

displaying, on a touch sensing display of a terminal device, a first search interface corresponding to a text-based search, and a browsing region to display content, the first search interface including a search window for receiving a text input of user associated with the text-based search sensing, by the at least one processor, a call interaction of a second search interface, received via a touch input on the touch sensing display, while the first search interface and the browsing region are displayed, the second search interface including at least two graphic user interfaces (GUI) for a plurality of recognition searches, displayed together, the GUIs including at least two of a video recognition-based search, a voice recognition-based search, and a music recognition-based search, the call interaction being a touch gesture operation on the touch sensing display, the touch gesture operation being a continuous touch input;

rendering, using the at least one processor, the second search interface when the call interaction is sensed;

visually dimming, using the at least one processor, the browsing region in response to the rendering of second search interface while maintaining visual brightness levels of the second search interface and the first search interface; and displaying, using the at least one processor, the first search interface, the rendered second search interface and the visually dimmed browsing region together with one another on the touch sensing display, wherein at least part of the previously displayed browsing region is covered by the rendered second search interface, and on the touch sensing display, a region of the first search interface and a region of the rendered second search interface are adjacent to each other;

returning, using the at least one processor, the touch sensing display to not display the second search interface in response to a touch input being received on the visually dimmed browsing region during display of the second search interface;

undimming, using the at least one processor, the visually dimmed browsing region; and expanding, using the at least one processor, the browsing region into the region of the second search interface.

2. The method of claim 1, wherein
the at least two graphical user interface (GUI) correspond to at least two of an image recognition-based search, a voice recognition-based search, and a music recognition-based search.

3. The method of claim 1, wherein the displaying of the second search interface comprises visualizing and displaying the second search interface in a pull-down menu or a drop-down menu corresponding to a drag input as the call interaction on the touch sensing display while displaying the first search interface and the browsing region.

4. The method of claim 3, further comprising:
rolling back progress of the visualization, using the at least one processor, in response to an absence of the drag input and a value of a progressing state of a visualization of the second search interface being lower than a desired threshold value; and returning the touch sensing display, using the at least one processor, to a state of displaying the first search interface and the browsing region.

5. The method of claim 1, wherein the call interaction comprises a drag input on the touch sensing display.

6. A non-transitory computer-readable recording medium storing an executable application, which when executed causes at least one processor to:
display a first search interface corresponding to a text-based search and a browsing region to display content on a touch sensing display;

prominently display a second search interface on the touch sensing display in response to a call interaction of the second search interface corresponding to a plurality of recognition searches being sensed in response to a touch input on the touch sensing display during the displaying of the first search interface and the browsing region, the first search interface including a search window for receiving a text input associated with the text-based search,
the second search interface including at least two graphic user interfaces (GUI) corresponding to the plurality of recognition searches displayed together, the GUIs including at least two of a video recognition-based search, a voice recognition-based search, and a music recognition-based search, and
the call interaction being a touch gesture operation on the touch sensing display, the touch gesture operation being a continuous touch input;

visually dim the browsing region in response to the display of second search interface while maintaining visual brightness levels of the second region interface and the first region interface;

display the first search interface, the second search interface and the visually dimmed browsing region together with one another on the display, wherein
at least part of the previously displayed browsing region is covered by the displayed second search interface, and
a region of the first search interface and a region of the displayed second search interface are adjacent to each other;

return the touch sensing display to not display the second search interface in response to a touch input being received on the visually dimmed browsing region during display of the second search interface;

undim the visually dimmed browsing region; and
expand the browsing region into the region of the second search interface.

7. The non-transitory computer-readable recording medium of claim 6, wherein the at least two graphical user interface (GUI) corresponds to at least two of an image recognition-based search, a voice recognition-based search, and a music recognition-based search.

8. The non-transitory computer-readable recording medium of claim 6, wherein the displaying of the second search interface comprises visualizing and displaying the second search interface in a pull-down menu or a drop-down menu corresponding to a drag input as the call interaction on the touch sensing display while displaying the first search interface and the browsing region.

9. The non-transitory computer-readable recording medium of claim 8, wherein the executable application, which when executed further causes the at least one processor to:
roll back progress of the visualization in response to an absence of the drag input and a value of a progressing state of a visualization of the second search interface being lower than a desired threshold value, and
return the touch sensing display to a state of displaying the first search interface and the browsing region.

10. The non-transitory computer-readable recording medium of claim 6, wherein the call interaction comprises a drag input on the touch sensing display.

11. A terminal device to provide a search service, the terminal device comprising:
a display;
a memory having computer readable instructions stored thereon; and
at least one processor configured to execute the computer readable instructions to,
display a first search interface corresponding to a text-based search in a first region of the display, a second search interface corresponding to a plurality of recognition searches in a second region of the display, and a browsing region to display content in a third region of the display, the first search interface including a search window for receiving a text input associated with the text-based search, and the second search interface including at least two graphic user interfaces (GUIs) for the plurality of recognition searches displayed together, the GUIs including at least two of a video recognition-based search, a voice recognition-based search, and a music recognition-based search,
render the second search interface when a call interaction with respect to at least one of the plurality of recognition searches is received in response to a touch input on the display during the displaying of the first search interface and the browsing region, the call interaction being a touch gesture operation on the touch sensing display, the touch gesture operation being a continuous touch input,
visually dim the browsing region in response to the rendering of second search interface while maintaining visual brightness levels of the second region interface and the first region interface,
display the first search interface, the rendered second search interface and the visually dimmed browsing region together with one another on the display, wherein at least part of the previously displayed browsing region is covered by the rendered second search interface, and a region of the first search interface and a region of the rendered second search interface are adjacent to each other, and
in response to receiving an input at the visually dimmed browsing region during display of the second search interface,
eliminate the second search interface on the display,
undim the visually dimmed browsing region, and
expand the third display region into the region of the eliminated second search interface.

12. A terminal device to provide a search service, the terminal device comprising:
a touch sensing display;
a memory having computer readable instructions stored thereon; and
at least one processor configured to execute the computer readable instructions to,
display a first search interface corresponding to a text-based search, a second search interface corresponding to a plurality of recognition searches, and a browsing region on the touch sensing display, the first search interface including a search window for receiving a text input associated with the text-based search, the second search interface including at least two graphic user interfaces (GUI) for the plurality of recognition searches displayed together, the GUIs including at least two of a video recognition-based search, a voice recognition-based search, and a music recognition-based search,
render the second search interface when a call interaction with respect to at least one of the plurality of recognition searches is received in response to a touch input on the touch sensing display during the displaying of the first search interface and the browsing region, the call interaction being a touch gesture operation on the touch sensing display, the touch gesture operation being a continuous touch input,
visually dim the browsing region in response to the rendering of second search interface while maintaining visual brightness levels of the second region interface and the first region interface,
display the first search interface, the rendered second search interface and the visually dimmed browsing region together with one another on the touch sensing display, wherein at least part of the previously displayed browsing region is covered by the rendered second search interface, and a region of the first search interface and a region of the rendered second search interface are adjacent to each other,
return the touch sensing display to not display the second search interface in response to a touch input being received on the visually dimmed browsing region during display of the second search interface,
undim the visually dimmed browsing region, and
expand the browsing region into the region of the second search interface.

13. A terminal device to execute an application providing a search service, the terminal device comprising:
a touch sensing display;
a memory having computer readable instructions stored thereon; and
at least one processor configured to execute the computer readable instructions to,
display a first search interface corresponding to a text-based search, the text-based search corresponding to a code stored in the memory, the first search interface including a search window for receiving a text input associated with the text-based search,
prominently display a second search interface corresponding to a plurality of recognition searches on the touch sensing display, the second search interface including at least two graphic user interfaces (GUI) for the plurality of recognition searches displayed together, the GUIs including at least two of a video recognition-based search, a voice recognition-based search, and a music recognition-based search, the displaying the second search interface occurring when a call interaction with respect to at least one of the plurality of recognition searches is received in response to a continuous touch input on the touch sensing display during the displaying of the first search interface and the browsing region,
visually dim the browsing region in response to the displaying of second search interface while maintaining visual brightness levels of the second region interface and the first region interface,
display the first search interface, the second search interface and the visually dimmed browsing region together with one another on the touch sensing display,
wherein at least part of the previously displayed browsing region is covered by the second search interface, and, on the touch sensing display, a region of the first search interface and a region of the second search interface are adjacent to each other, and in response to a touch input being received on the visually dimmed browsing region, during display of the second search interface, not display the second search interface, undim the visually dimmed browsing region, and expand the browsing region into the region of the second search interface.

14. The terminal device of claim 13, wherein the call interaction comprises a drag input on the touch sensing display.

15. The terminal device of claim 13, wherein the second search interface is configured to provide information associated with the code, and the second search interface is displayed as a pull-down menu or a drop-down menu in response to a drag input on the touch sensing display while displaying the first search interface and the browsing region.

16. The terminal device of claim 15, wherein, in response to an absence of the drag input and a value of a progressing state of a visualization of the second search interface being lower than a desired threshold value, the second search interface is configured to be rolled back.

* * * * *